July 5, 1966  B. ROSENBLUM  3,259,016
TUNABLE SEMICONDUCTOR OPTICAL MODULATOR
Filed Nov. 28, 1962

INVENTOR.
BRUCE ROSENBLUM
BY
Attorney

United States Patent Office 3,259,016
Patented July 5, 1966

3,259,016
TUNABLE SEMICONDUCTOR OPTICAL
MODULATOR
Bruce Rosenblum, Princeton, N.J., assignor to Radio
Corporation of America, a corporation of Delaware
Filed Nov. 28, 1962, Ser. No. 240,610
2 Claims. (Cl. 88—61)

This invention relates to improved optical maser or laser transmitting systems. In particular, this invention relates to improved methods of and means for modulating laser light.

The term laser is used to refer to a device which provides "light amplification by stimulated emission of radiation." The laser device is, at present, most commonly used as a source of coherent light.

In general, a laser includes (1) an active lasing material, or substance that will produce stimulated emission of radiation (2) an excitation source that pumps power into the active lasing material, and usually (3) a resonant structure or resonant cavity which is used to resonate the stimulated emission.

The active lasing material is a material having at least two states which are separated in energy by an amount corresponding to a characteristic output frequency.

The active material is characterized by the properties that (1) its atomic particles can be excited into the higher or two energy levels by means of the excitation source whereby an inverted population condition may be produced, and (2) when the atomic particles return to the lower energy level, the active material emits electromagnetic radiations (i.e., light). The emitted light is such that, within the active lasing material, an incident photon triggers an ion to emit a photon in phase with and in the same direction as the incident photon. Thus, substantially all of the emitted light is substantially in phase and is described as coherent light.

The excitation source, or pumping source, is a source of energy which is positioned adjacent to the active lasing material and which is used to excite the ions in the active material into a higher energy level. The pumping source may comprise a radio frequency field, a light source (e.g., a xenon flash tube), or other known types of energy sources.

The resonant structure, or resonant cavity, normally includes two light reflective surfaces, such as mirrors, positioned at the ends of the active lasing material. At least a portion of one of the light reflective surfaces is partially transparent so that output light may be obtained from the laser through this partially transparent surface. The light reflective surfaces are precisely oriented so that at least one resonant mode exists between the mirrors at frequencies for which the spacing between mirrors corresponds to a path length of an integral number of half wavelengths.

More detailed description of laser structures, operation and theory is given by Vogel et al. in Electronics, October 27, 1961, found on page 40–47, and by Boyd et al. in Physical Review Letters 8, April 1, 1962, pages 269–272.

When a laser is designed to communicate information, it is necessary to modulate, with signal information, the coherent light beam produced by the laser. Thus, the coherent light beam of the laser is modulated in phase, frequency or amplitude to convey information from one location to another.

In the prior art, it has been suggested to modulate a light beam by passing the beam through a semiconductive body, and to vary the band gap of the semiconductive body by means of an electric field to modulate the light beam by absorption or reflection. This technique is limited in that it is useful only when the wavelength of the light to be modulated is slightly less than the band gap of the selected semiconductive material. Thus, to utilize such a laser communication system, it is necessary to select materials such that the laser output frequency is substantially matched with the band gap of the semiconductive material in the unexcited condition. It has been found that this "matching" is generally not possible, and frequently not desirable, with known lasing materials and known semiconductive bodies.

It is an object of this invention to provide an improved laser transmitting system.

It is another object of this invention to provide a novel laser modulating device characterized in that the modulating device may be tuned to "match" the laser frequency.

These and other objects are accomplished in accordance with this invention by providing a laser transmitting system including a laser which produces a source of coherent light. The coherent light of the laser is modulated by passing the light through a semiconductive or insulating body. The semiconductive-insulating body is positioned in a magnetic field. The magnetic field produces strongly frequency-dependent variations of the complex dielectric constant of the semiconductive body. The optical properties of the semiconductive body are wholly determined by the complex dielectric constant. Thus, for example, the absorption curve as a function of frequency, will exhibit large fluctuations (i.e. there will be regions in what is normally the absorption band where the semiconductor is transparent). These fluctuations occur because the valence band and the conduction band are separated into Landau levels by the magnetic field. Transitions can only occur between the Landau levels and not at arbitrary frequencies. By adjusting the magnetic field, the variations of the complex dielectric constant may be shifted in frequency. Thus, assuming a predetermined laser frequency, the optical properties of the semiconductive material can be shifted to substantially match this predetermined frequency. The effective dielectric constant of the semiconductive means is then modulated, by a signal controlled electric field, to modulate the coherent light beam.

The invention will be described in greater detail by reference to the accompanying single sheet of drawings wherein.

Figure 1:
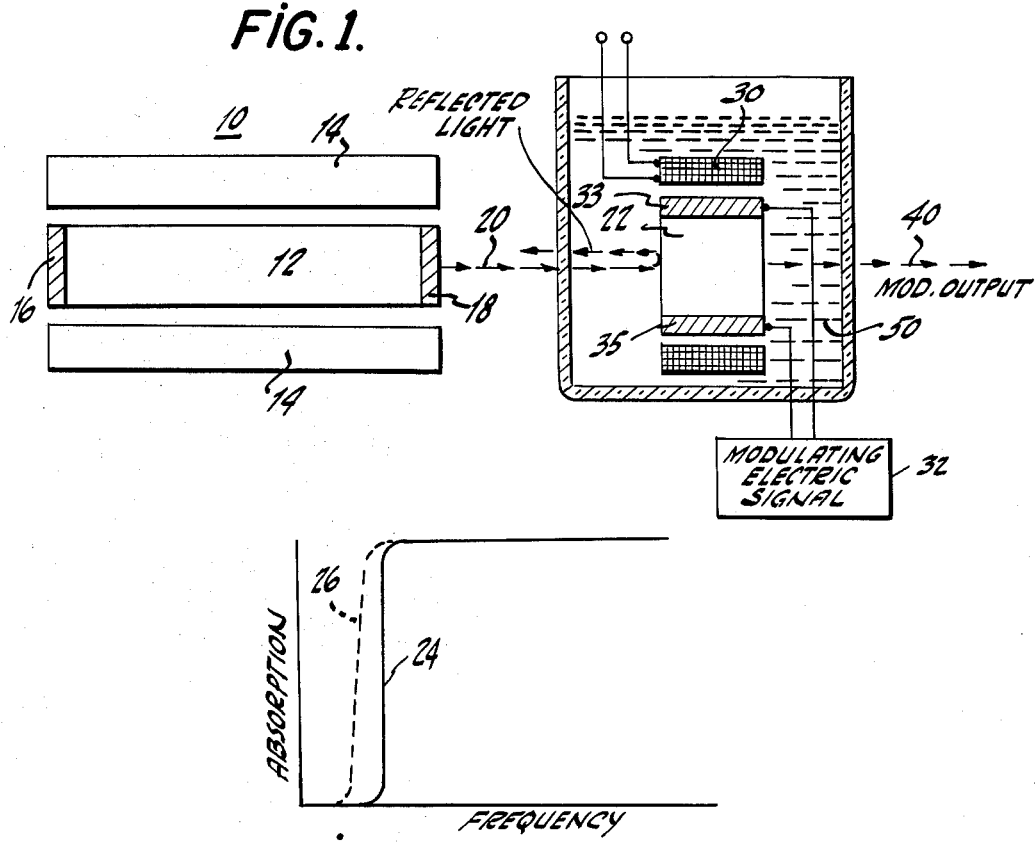
FIG. 1 is a partially schematic view of a laser communication system in accordance with this invention.

FIG. 1 shows an apparatus 10 for producing coherent radiation. When the coherent radiation is in the light spectral range, the device 10 is known as a laser. The laser 10 generally comprises an active lasing material 12, a pumping source 14, and a pair of optical reflecting surfaces 16 and 18 which define the opposite ends of a resonant body or resonant cavity.

The active lasing material 12 may comprise any known substance which has at least two atomic states, or energy levels separated by an amount corresponding to a characteristic frequency of the active lasing material 12. The active lasing material 12 has the property of being excitable into an inverted population density condition, i.e., an excess population can be established in the upper, or one of the upper, energy states. The active material 12 emits substantially coherent radiation as the atomic particles return from the higher energy level to a lower energy level. A specific example of an active lasing material is calcium fluoride doped with divalent samarium.

The pumping source 14 may comprise any source of energy which is capable of exciting the molecules or ions in the active material 12 from a lower energy level into one of the desired higher energy levels. In other words, the pumping source 14 is a source of radiation which is capable of establishing the inverted population density condition in the active lasing material 12. Examples of such pumping sources are a means for providing a radio frequency field, a xenon flash tube, or other suitable known types of energy sources.

The active material 12 is usually positioned in a resonant cavity. Thus, adjacent to the ends of the active lasing material 12 are the two light reflecting devices or mirrors 16 and 18. At least a portion of one of the mirrors, e.g., light reflecting device 18, is made partially transparent so that output light may be obtained from the device 10. The light reflecting devices may be formed of a highly light reflecting material such as silver, or of multiple layer structures such as the conventional Fabry-Perot interference type light reflectors.

Figure 2:
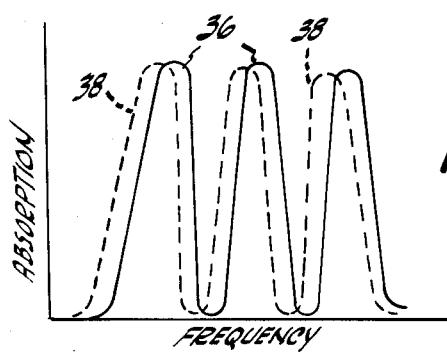
FIG. 2 is a graphical, characteristic curve showing the light absorption of typical prior art devices; and, FIG. 3 is a graphical, characteristic curve showing the light absorption of the embodiment of FIG. 1.

The operation of the laser device 10 is known. During operation, it produces an unmodulated coherent light beam 20 which is passed through a semiconductive or insulating body 22 to be modulated. The semiconductive or insulating body 22 has a minimum number of free carriers and may be a material such as pure germanium, diamond, gallium arsenide, cadmium sulphide or other insulating type semiconductor body. The modulation of a beam of light by imposing a strong electric field upon a semiconductor through which the light is being passed has been known. The electric field effectively reduces the band gap of the semiconductive material. Thus, light having a photon energy slightly less than the semiconductor band gap will be more strongly absorbed when the electric field is applied than in the absence of the electric field. This effect is illustrated in FIG. 2 wherein the absorption edge is illustrated by the solid line curve 24 when no electric field is applied to the semiconductor, and by the dotted curve 26 when an electric field is applied. The position of curve 26 is determined by the amount of voltage applied. For example, if a field approximately 5,000 volts per centimeter is applied to a semiconductor body of gallium arsenide, the absorption edge will shift about $5 \times 10^9$ c.p.s. As is clear from FIG. 2, any light having a frequency between the two curves 24 and 26 can be modulated, by absorption with the electric field. The absorption edge may be shifted to positions between the curves 24 and 26 by the application of intermediate voltages.

As can be seen from FIG. 2, light frequencies below curve 26 or above curve 24 will not be affected by the application of reasonable magnitude electric fields to the semiconductive body. Thus, prior to this invention, for frequencies other than this relatively narrow band, i.e., between the curves 24 and 26, this type of modulation could not be used.

Referring again to FIG. 1, it should be noted that the semiconductor 22 is positioned in a magnetic field applied by means of a coil 30 along with the electric field. When a semiconductor is placed in a magnetic field, the allowed states in the valence and conduction bands are the Landau levels. Light can only cause transitions from a Landau level in the valence band to a Landau level in the conduction band. This means that not all optical frequencies which are larger than the band gap will be absorbed. Just which frequencies will be absorbed is a function of strength of the magnetic field.

Thus, the unmodulated laser beam 20 is directed through the semiconductor body 22. As stated above, the semiconductor body 22 is positioned in a magnetic field provided by any known means, such as the coil 30. Also, an electrical field modulating signal is applied to the semiconductor body 22 from a source 32. The electrical signal may be applied by any known means of applying an electric field to a semiconductor or insulator as by positioning the insulator between two electrodes 33 and 35, or by placing it in a microwave field (not shown).

Figure 3:
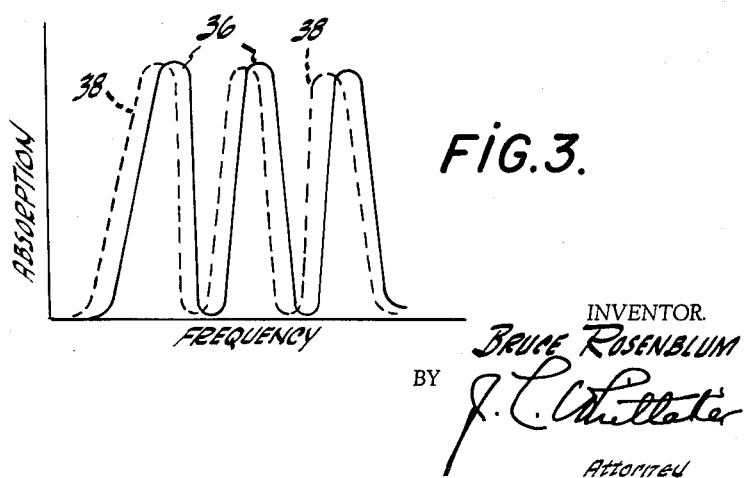

From the showing of FIG. 3, it can be seen that the semiconductor 22 of FIG. 1 has several effective absorption edges 36 due to the presence of the magnetic field. Each of the absorption edges 36 corresponds to a different transition between Landau levels. Thus, any one or more of the electrically unmodulated absorption edges 36 may be shifted to lower, or higher, frequencies, as shown by dotted curve 38, by means of the electric field. (Instead of a shift, a broadening of the absorption peaks 36 may occur which will produce the same modulation effect.) Since there are many different effective absorption edges, and since the frequencies at which the different effective absorption edges are located may be adjusted, a laser may be devised for any selected frequency, and a semiconductor 22 selected which has an absorption edge that is of a lower frequency than the laser beam 20. The magnetic field can be adjusted so that the frequency of the laser beam 20 is adjacent to the edge of an effective absorbing region. When this has been done, the signal-controlled electric field, from the source 32, is used to shift the effective absorption edge and modulate the laser beam 20 to provide a signal modulated laser beam 40.

As a specific example of a laser transmitting system according to this invention, a semiconductor body 22 of gallium arsenide having an absorption edge of approximately $3.3 \times 10^{14}$ c.p.s. and capable of absorbing light at any frequency higher than this may be employed. This absorption edge may be shifted by about $5 \times 10^9$ c.p.s. by the application of an electric field of approximately 5,000 volts per centimeter. Thus, to use gallium arsenide as a light modulator without a magnetic field, the laser frequency must be within approximately one part in $10^5$ of the band edge of the gallium arsenide. However, with a magnetic field, a number of effective absorption edges are provided. The effective absorption edges are at different frequencies depending upon the magnetic field strength. Thus, the magnetic field is adjusted so that an absorption edge is adjacent to the laser frequency, and then the electric field is applied to modulate the laser light, e.g., $5 \times 10^9$ c.p.s. for 5,000 volts per centimeter.

In most semiconductive-insulating materials, the effective absorption edges 36 will be sharper, i.e., more vertical, as shown in FIG. 3, if the semiconductor-insulator is cooled. The lower the temperature, the more vertical the effective absorption edges. Therefore, the semiconductive type insulator is preferably cooled by any known means, e.g., by being immersed in a liquid cooling medium 50.

Although the invention has been described as being directed to the modulation of light by providing effective absorption edges, and modulating these edges by an electric field, it should be understood that the frequency dependency of the complex dielectric constant, caused by the magnetic field, causes all optical properties of the semiconductor to be frequency dependent also. Thus, any of the optical properties may be adjusted by the magnetic field and then modulated by the electric field. In other words, the semi-conductive-insulator may be positioned in a magnetic field and used as a reflection device, a phase shifting device, or to change the polarization of the light passing therethrough. The maximum slope of any one of these properties of the semiconductor may be adjusted to approximately match the laser frequency by means of the magnetic field. Then, the selected property may be modulated by the electric field.

What is claimed is:
1. In combination,
   (a) means for generating an optical beam at a first frequency,
   (b) a semiconductor positioned in the path of said optical beam, said semiconductor having an absorption edge at a frequency lower than said first frequency and said semiconductor being capable of exhibiting an additional absorption edge at a frequency at or near said first frequency, (c) magnetic field means for establishing Landau levels, and thereby addition absorption edges including said additional absorption edge at a frequency at or near said first frequency, in said semiconductor, and (d) means for shifting the frequencies of said absorption edges in said semiconductor in response to and in accordance with a modulating signal.

2. Apparatus as claimed in claim 1 wherein said last mentioned means comprises means for establishing an electric field in said semiconductor and means for varying said electric field in accordance with said modulating signal.

References Cited by the Examiner

UNITED STATES PATENTS

| | | | |
|---|---|---|---|
| 2,776,367 | 1/1957 | Lehovec | 88—61 X |
| 2,936,373 | 5/1960 | Welker et al. | 250—83.3 |
| 2,960,914 | 11/1960 | Rogers | 88—61 |
| 2,964,619 | 12/1960 | Hahn et al. | 88—61 X |
| 2,987,959 | 6/1961 | Kimmel | 88—61 |
| 3,025,763 | 3/1962 | Schwartz et al. | 88—61 |
| 3,126,485 | 3/1964 | Ashkin et al. | 88—61 X |

FOREIGN PATENTS 733,566   7/1955   Great Britain.

JEWELL H. PEDERSEN, *Primary Examiner.*

J. L. CHASKIN, W. L. SIKES, *Assistant Examiners.*